US008234937B2

(12) United States Patent
Ramalingam

(10) Patent No.: US 8,234,937 B2
(45) Date of Patent: Aug. 7, 2012

(54) VERTICAL AXIS ADJUSTABLE PLATFORM AND TORQUE SENSOR

(75) Inventor: Prem Anand Ramalingam, Tamil Nadu (IN)

(73) Assignee: Honeywell International Inc., Morristown, NJ (US)

( * ) Notice: Subject to any disclaimer, the term of this patent is extended or adjusted under 35 U.S.C. 154(b) by 570 days.

(21) Appl. No.: 12/510,980

(22) Filed: Jul. 28, 2009

(65) Prior Publication Data

US 2011/0029257 A1 Feb. 3, 2011

(51) Int. Cl.
*F16M 11/24* (2006.01)
*E04G 17/06* (2006.01)
*G01L 3/00* (2006.01)

(52) U.S. Cl. ......... 73/862.339; 73/862.191; 73/862.325; 73/862.338; 73/862.321; 254/104; 248/668

(58) Field of Classification Search ............. 73/862.321, 73/862.191, 862.325, 862.339, 862.338; 254/104.1; 248/668
See application file for complete search history.

(56) References Cited

U.S. PATENT DOCUMENTS

| | | | |
|---|---|---|---|
| 6,740,033 B1 | 5/2004 | Olejniczak et al. | 600/301 |
| 7,292,828 B1 | 11/2007 | Liu et al. | 455/91 |
| 7,307,517 B2 | 12/2007 | Liu et al. | 340/441 |
| 7,380,464 B2 | 6/2008 | Hasken et al. | 73/801 |
| 7,395,724 B2 | 7/2008 | Bunyer et al. | 73/862.339 |
| 7,424,830 B2 | 9/2008 | Matsusaki et al. | 73/862.331 |
| 2007/0144814 A1 | 6/2007 | Arnold et al. | 180/402 |

OTHER PUBLICATIONS

TMS 9000 Series, Torque Measurement System, Lebow Products, Inc., Dec. 2004.
TMS 9000 Rotary Torque Measurement System, Honeywell, Jul. 2008.

*Primary Examiner* — Lisa Caputo
*Assistant Examiner* — Jonathan Dunlap
(74) *Attorney, Agent, or Firm* — Seager Tufte & Wickhem LLC

(57) ABSTRACT

A torque sensor includes an adjustable platform vertically adjustable to place a sensing module near a rotating target to obtain measurements there from with a sensing element. The apparatus can be configured to include a bottom channel mounted to a base and a PCB tray mounted to a top channel, the PCB tray and top channel vertically adjustable from the base by a rotating shaft. The top and bottom channels are coupled to side bars and side channels in pairs movably connected by joint pins with a rotatable shaft movably connecting said joint pins. The sensing module is movable with respect to the base via rotation of said rotatable shaft causing movement of said pair of side bars and side channels, placing said sensing element nearest a target to obtain rotational movement data.

20 Claims, 7 Drawing Sheets

VERTICAL AXIS ADJUSTABLE PLATFORM AND TORQUE SENSOR

TECHNICAL FIELD

Embodiments are generally related to torque sensors. Embodiments are also related to digital telemetry torque systems. Embodiments are additionally related to adjustable platforms for use with torque sensors.

BACKGROUND OF THE INVENTION

In systems that incorporate the use of rotating shafts, it is often desirable to generate data indicative of the torque and speed of such shafts in order to control the same or other devices associated with rotatable shafts. Accordingly, it is desirable to detect and measure torque in an accurate, reliable and inexpensive manner. The ability to detect and measure torque imposed on a rotating shaft, e.g., a drive shaft, may be useful in applications such as, for example, automotive vehicles. For example, it may be desirable to measure the torque on a rotating drive shaft of a vehicle's drivetrain, in a vehicle's engine (e.g., the crankshaft), or in an anti-locking braking system (ABS).

BRIEF SUMMARY

The following summary is provided to facilitate an understanding of some of the features unique to what is disclosed herein and is not intended to be a full description. A full appreciation of the various aspects of the embodiments can be gained by taking the entire specification, claims, drawings, and abstract as a whole.

It is, therefore, one aspect of the disclosed embodiment to provide an improved torque sensor.

It is another aspect of the disclosed embodiment to provide an adjustable platform and torque sensor.

It is a further aspect of the disclosed embodiment to provide an improved vertical axis adjustable platform capable of providing enhanced sensitivity and infinite resolution for the interface of a torque sensor with a rotating mechanical system (e.g., a rotating shaft).

The aforementioned aspects, features and advantages of the disclosed embodiment can now be achieved as described herein. A vertical axis torque sensor can include an adjustable platform. The apparatus can be configured to include a base member associated with an adjustable mechanism including a torque sensor mounted thereon to attain enhanced rotation detection sensitivity and resolution. The adjustable mechanism can be adjusted in order to permit a PCB tray to enable a torque sensor to engage a shaft in vertical axis movement relative to the base member. The adjustable mechanism can include two sets of side bars and a side channels that can each be rotatably held together using side pins. The side pins can each be configured to receive a lead screw (e.g., threaded metal shaft). The side channels can be coupled to a Top Channel. The side bars are coupled to a bottom channel. The top channel can be attached to the PCB tray utilizing one or more head cap screws. The bottom channels can be attached to a base utilizing one or more head cap screws. The lead screw can operate the adjustable mechanism in-between the set of side bars and side channels. As the screw is rotated, the side bars and side channel can move the top channel vertically with respect to the base.

A pair of guide plates can be attached to both sides of the adjustable mechanism utilizing one or more joint pins and retaining rings mounted in association with the bottom and top channels. The adjustable mechanism in association with the metal screw and the guide plates can be employed to lift the PCB tray to a "stop" position. The sensor element held within the PCB tray can then be maintained at a particular height in order to attain enhanced sensitivity and performance. The bottom channel can be mounted on the base member and securely fastened to a platform cover. The sensor element(s) can be peripherally or centrally mounted on a target (e.g., rotating shaft) in order to create an input signal (e.g., torque measurement) before transmitting the input signal to a signal-processing module.

The torque measurement can be transmitted via the PCB tray from the transmitter PCB associated with the rotating shaft, from the torque sensor. The adjustable platform apparatus is capable of adjusting the sensitivity associated with various shaft diameters for receiving a torque signal. Such a vertical axis adjustable platform associated with the torque sensor can provide complete torque measurement capabilities with standard analog, frequency and digital output signals. The adjustable platform can perform well under extreme conditions and can be utilized in a variety of applications while offering enhanced accuracy and durability.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Aspects and features of the invention discussed herein should not be construed in any limited sense. That is, it should be appreciated that such embodiments reveal details of the structure in preferred or alternative form necessary for a better understanding of the invention and may be subject to change by skilled persons within the scope of the invention and without departing from the concept thereof. The particular values and configurations discussed in these non-limiting examples can be varied and are cited merely to illustrate at least one embodiment and are not intended to limit the scope thereof.

Figure 1:
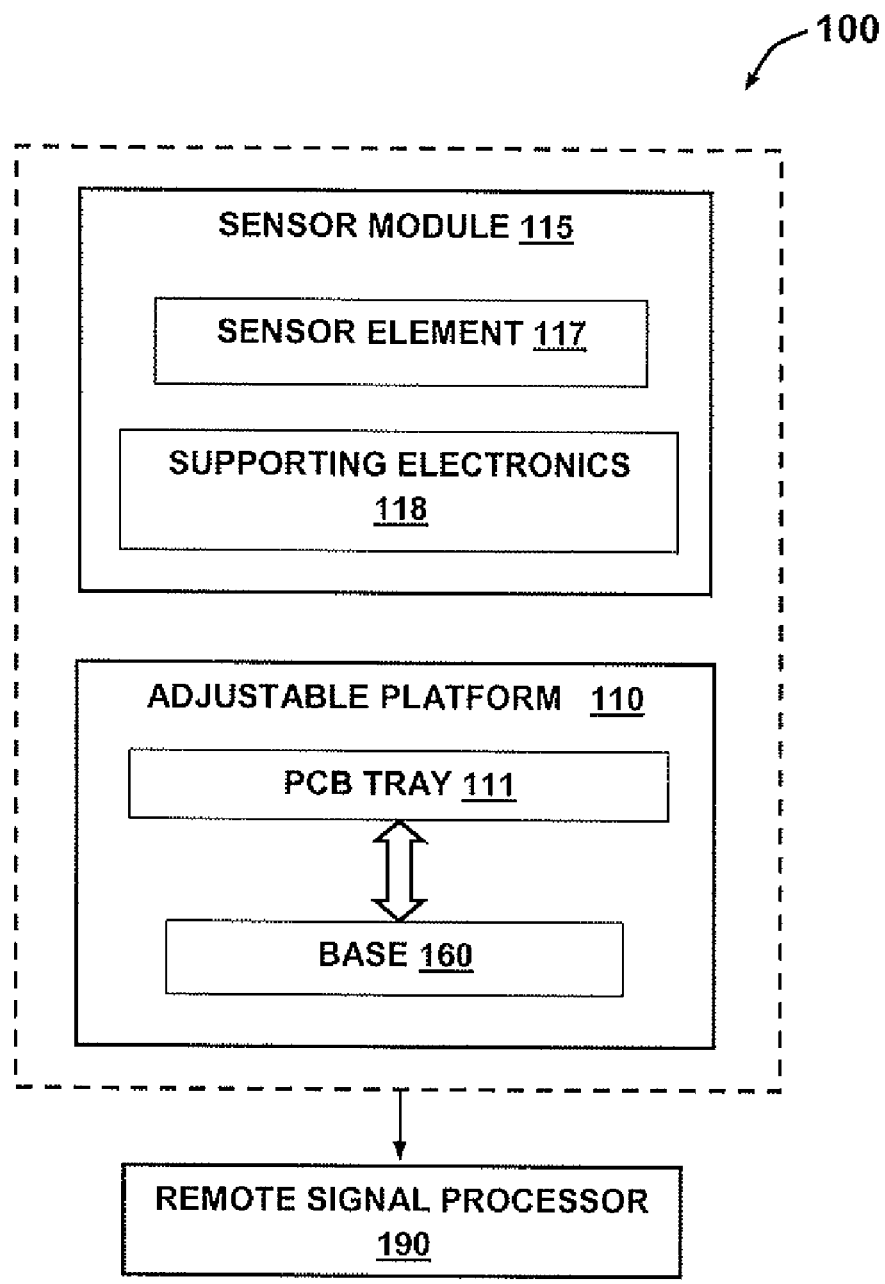
FIG. 1 illustrates a block diagram of a torque measuring system, which can be implemented in accordance with features of the present invention.

FIG. 1 illustrates a block diagram of a torque measurement system 100, which can be capable of being implemented in accordance with features of the present invention. The torque measurement system 100 can be utilized in wide variety of applications, including, but not limited to, steering wheel effort measurements in electronic power steering systems, determining the transmission output torque for electronically controlled shifting, cam and crankshaft torque measurements used for engine misfire detection, antilock braking system wheel torque measurements and brake pedal torque measurements for electric breaking. Readings obtained using torque measurement systems 100 are capable of being processed in a digital domain, providing enhanced accuracy and versatility.

The torque measurement system 100 generally includes an adjustable platform 110 supporting a sensor module. The adjustable platform, shown vertically adjustable in the drawing without intended limitation, can be adjusted (in all directions, depending on the application) to provide maximum resolutions and a high frequency response from the sensor module 115 when interfaced with a measured target (e.g., rotating shaft). The adjustable platform hardware 110 includes a SCB tray 111 that can be moved relative to a base 160. Movement of the SCB tray 111 vertically enables the sensor module 115 to obtain accurate reading for the torque measuring system 100. The sensor module 115 includes a sensor element 117 and supporting electronics 118 that can provide measurement signals to a remote signal processor 190 (e.g., external electronics, hardware, communications, software). The supporting electronics can include wiring, transmitters (optical, RF) supporting communication from the sensor to remote electronics. The supporting electronics 118 can include a signal processor configured to condition a measured signal and communicate with remote electronics (e.g., processors). The remote signal processor 190 can receive a signal from the torque sensor 100. The received signal can be scaled and filtered via a software system (not shown) in order to generate a variety of outputs, compatible with various data acquisition systems.

Figure 2:
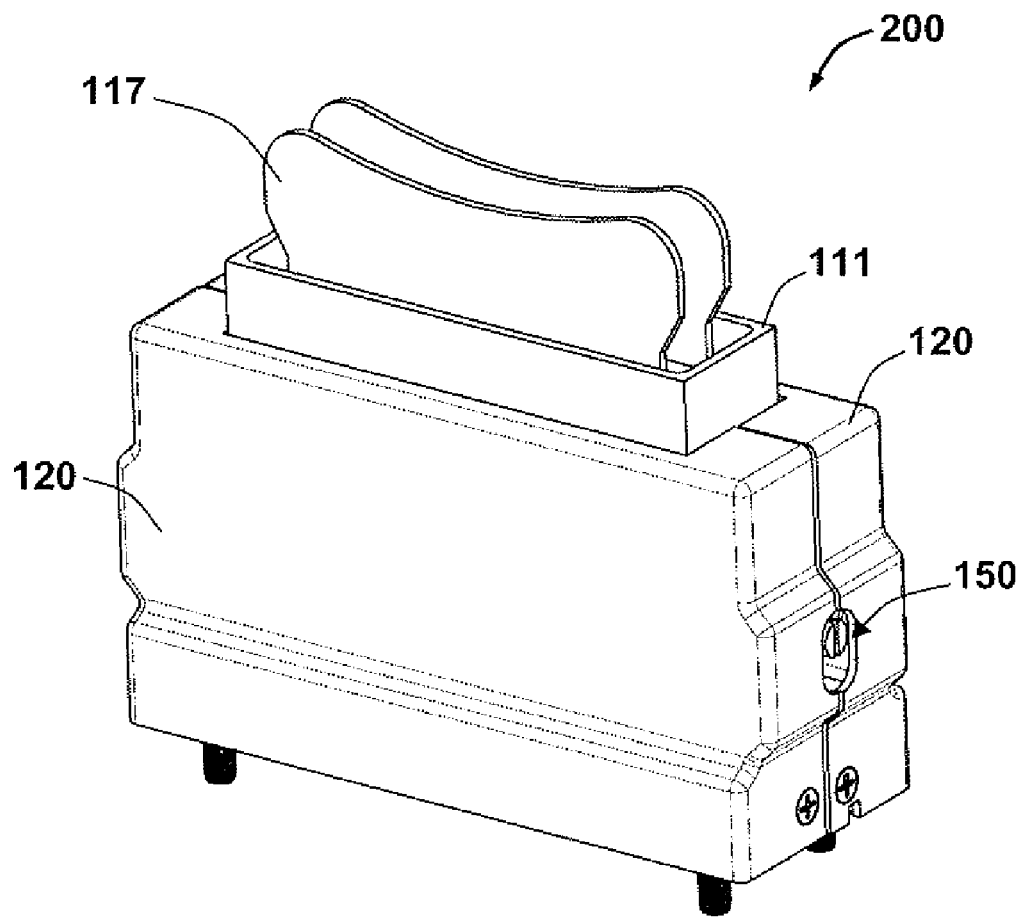
FIG. 2 illustrates a perspective view of a vertical axis adjustable platform apparatus, in accordance with features of the present invention.

FIG. 2 illustrates a perspective view of an adjustable platform 200, in accordance with features of the present invention. Note that in FIGS. 1-8 identical or similar blocks are generally indicated by identical reference numerals. The adjustable platform 200 can be capable of offering upgraded performance and network connectivity with respect to torque measurement system 100. The adjustable platform 200 can be adjusted in order to effectively receive the transmitted output signals from the sensor element 117 associated with the electronics 118 that together can be functioning as a dynamic rotating transmitter PCB. The adjustable platform 200 in association with a rotary in-line and reaction torque sensor can effectively measure torque signals in a variety of applications. The vertical axis adjustable platform apparatus 200 can be configured to include a top covers 120, an adjustable shaft 150 and a PCB tray 111 that will move vertically based on adjustment of the adjustable shaft 150 containing a sensor element 117.

Figure 3:
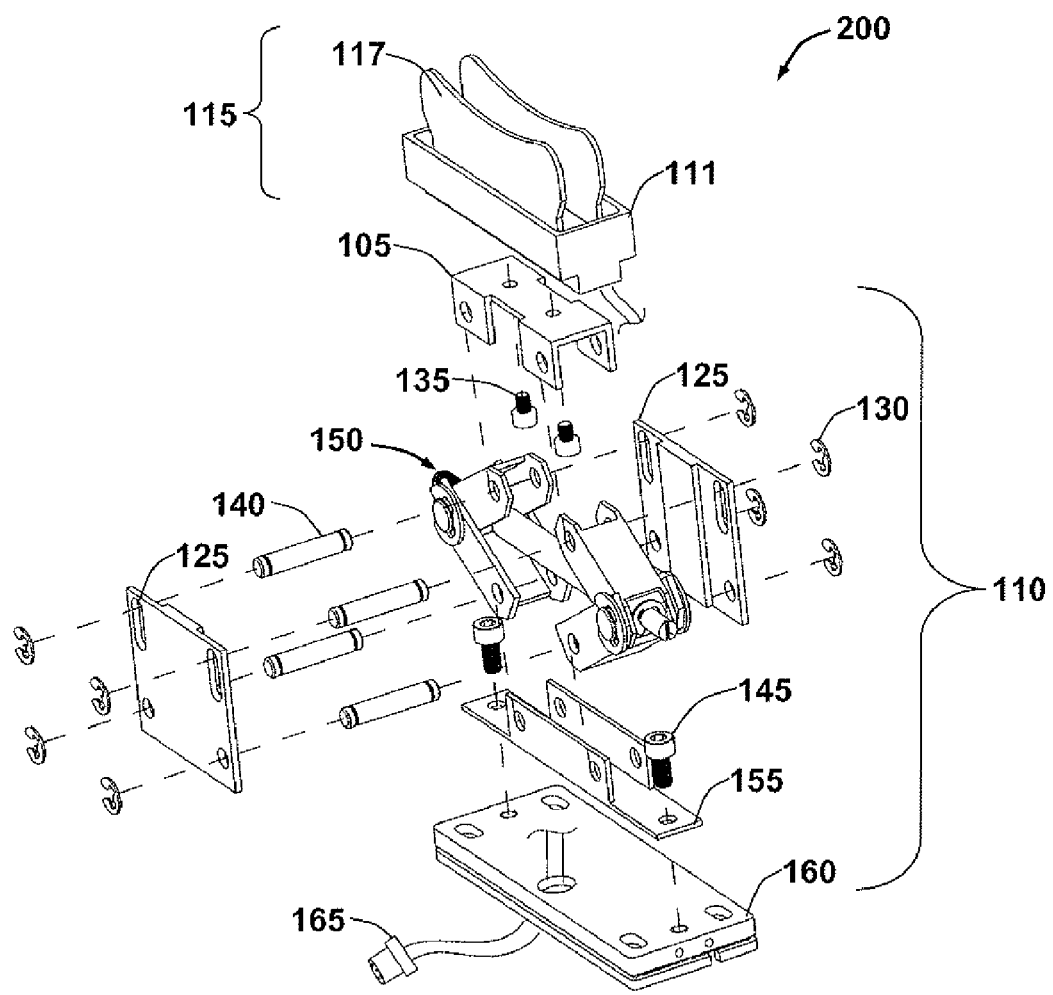
FIG. 3 illustrates an exploded view of the vertical axis adjustable platform apparatus, in accordance with features of the present invention.

FIG. 3 illustrates an exploded view of the adjustable platform 200, in accordance with a preferred embodiment. The apparatus 200 can be configured to include a base member 160 associated with the adjustable shaft 150 for moving the SCB tray 111 and mounting the torque sensor 117 with a target in order to attain enhanced detection sensitivity and broad resolution for measurement obtained from the target. The mechanically adjustable platform hardware 110 of the invention can include a pair of guide plates 125, a top channel 105 and a bottom channel 155. It should be appreciated that only one guide plate 125 can also be used. The adjustable shaft 150 in association with the guide plates 125 can be employed to evenly lift the PCB tray 111 to a "stop" position when it is accurately and/or evenly interfaced with a target requiring measurement. The PCB tray 111 can then be maintained at a particular height in order to attain an enhanced sensitivity and performance. The adjustable platform hardware 110 can further include one or more head cap screws such as, for example, head cap screw 135 and 145 and a number of joint pins such as, a joint pin 140 associated with a retaining pin 130. A connector 165 can be utilized to connect the adjustable platform apparatus 100 to the remote signal processor 190.

Figure 4:
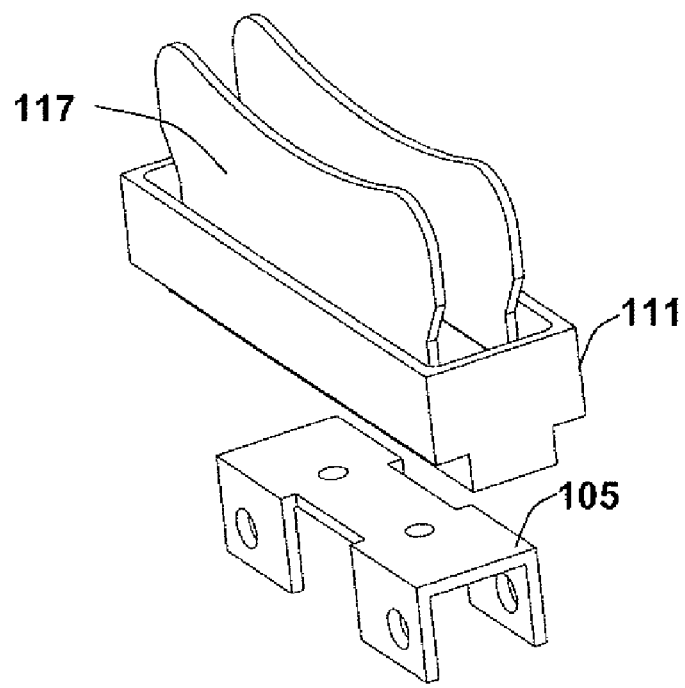
FIG. 4 illustrates a perspective view of a PCB tray in association with a top channel, which can be implemented in accordance with features of the present invention.

FIG. 4 illustrates a perspective view of the PCB tray 111 in association with the top channel 105, in accordance with a preferred embodiment. The top channel 105 can be attached to the PCB tray 111 utilizing the head cap screws 135.

Figure 5:
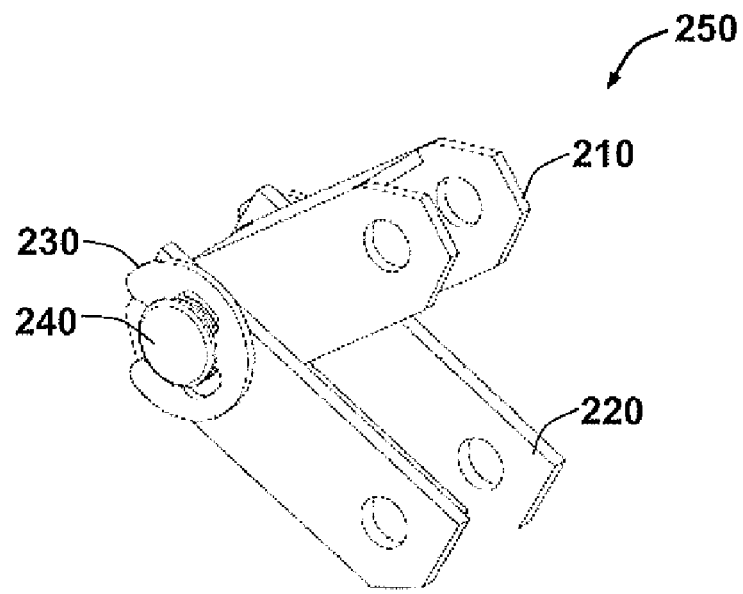
FIG. 5 illustrates a perspective view of a vertical axis adjustable means, in accordance with features of the present invention.

FIG. 5 illustrates a perspective view of the vertical axis adjustable mechanism 250, in accordance with a preferred embodiment. The vertical axis adjustable mechanism 150 generally includes a side bar 220 and a side channel 210. The side bar 220 and the side channel 210 can be attached to the adjustable shaft 150 (e.g., a thread screw) utilizing a side pin 240 and a retaining pin 230. The side channel 210 can be configured from a material such as, for example, aluminum depending upon design considerations.

Figure 6:
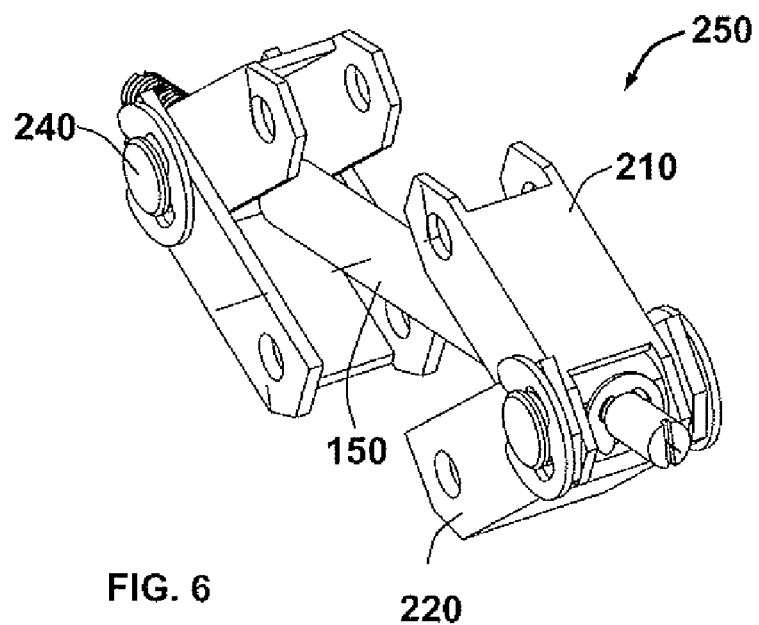
FIG. 6 illustrates a perspective view of a metal screw in association with the vertical axis adjustable means, in accordance with features of the present invention.

FIG. 6 illustrates a closer perspective view of an adjustable shaft 150 in association with a vertical axis adjustable mechanism 250. The vertical axis adjustable mechanism 250 can be inserted on both sides of the adjustable shaft 150. The adjustable shaft 150 can be configured from material such as, for example, aluminum, steel, lead and composites, again depending upon design considerations. It can be appreciated that other types of hard materials, e.g., metals and composites, can be utilized in place of the suggested metal in accordance with alternative embodiments.

Figure 7:
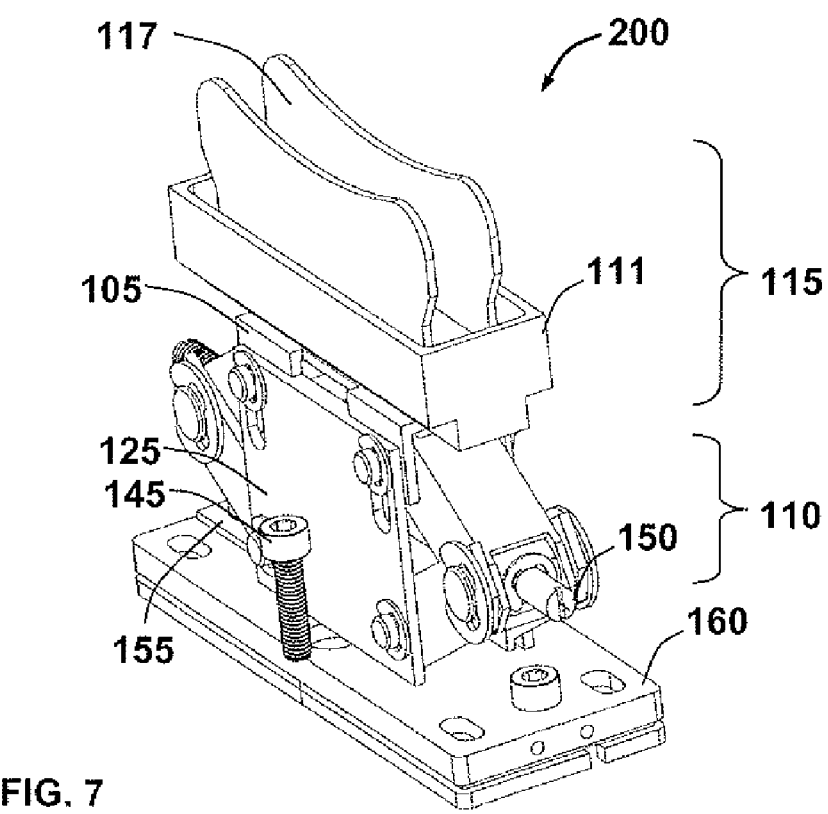
FIG. 7 illustrates an assembled view of the vertical axis adjustable platform apparatus, in accordance with features of the present invention.
Figure 8:
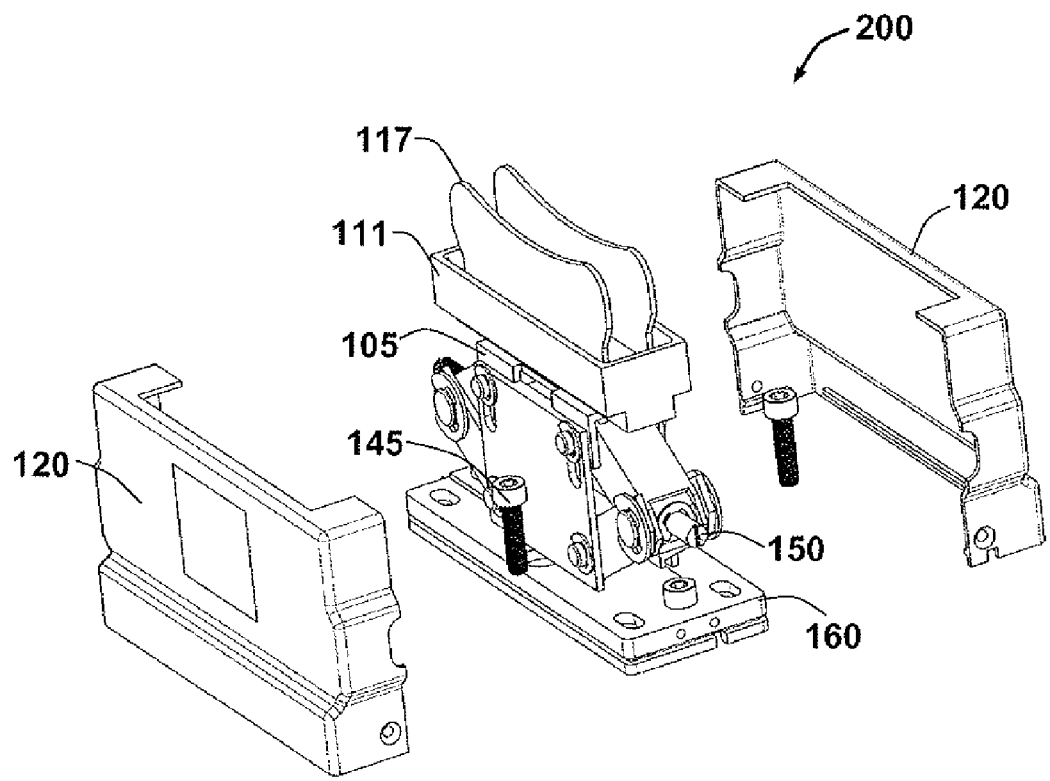
FIG. 8 illustrates a perspective view of the vertical axis adjustable platform apparatus in association with a cover, in accordance with features of the present invention.

FIG. 7 illustrates an assembled view of a vertical axis adjustable platform apparatus 200, in accordance with additional features of the invention. The vertical axis adjustable mechanism hardware 110 in association with the adjustable shaft 150 can be mounted in between the top channel 105 and the bottom channel 155. The guide plate(s) 125 can then be attached on at least one side of the vertical axis adjustable mechanism hardware 110 utilizing the joint pins 140 and the retaining rings 130. It should again be appreciated that one guide plate 125, instead of two, could also be used with similar results, in which case only one guide plate 125 is mounted on one side of the vertical axis mechanism hardware 110. The bottom channel 155 can then be mounted on the base member 160. The vertical axis adjustable mechanism hardware 110 in association with adjustable shaft 150 and the guide plate(s) 125 is capable of being adjusted in order to permit the PCB tray 110 and sensor element 117 to engage a target by vertical axis movement of the vertical axis adjustable platform apparatus 200. The vertical axis adjustable mechanism hardware 110 can then be covered utilizing covers 120, as depicted in FIG. 8.

The retaining rings 130 can include a number of recesses on the side thereof facing away and uniformly distributed throughout the periphery and extend inwardly radially from the outer peripheral surface of the retaining rings 130. Electronics 118 can be located within the PCB tray 111 in order to receive and condition the input signal before transmitting the signal to a remote signal processor 190. It can be appreciated that the torque signal can be transmitted wirelessly via the PCB tray 111 from a radio frequency transmitter (not shown) connected to the sensor element 117 interfacing with a target (e.g., rotating shaft). The adjustable platform apparatus 100 is capable of adjusting the sensitivity associated with various shaft diameters.

Figure 9:
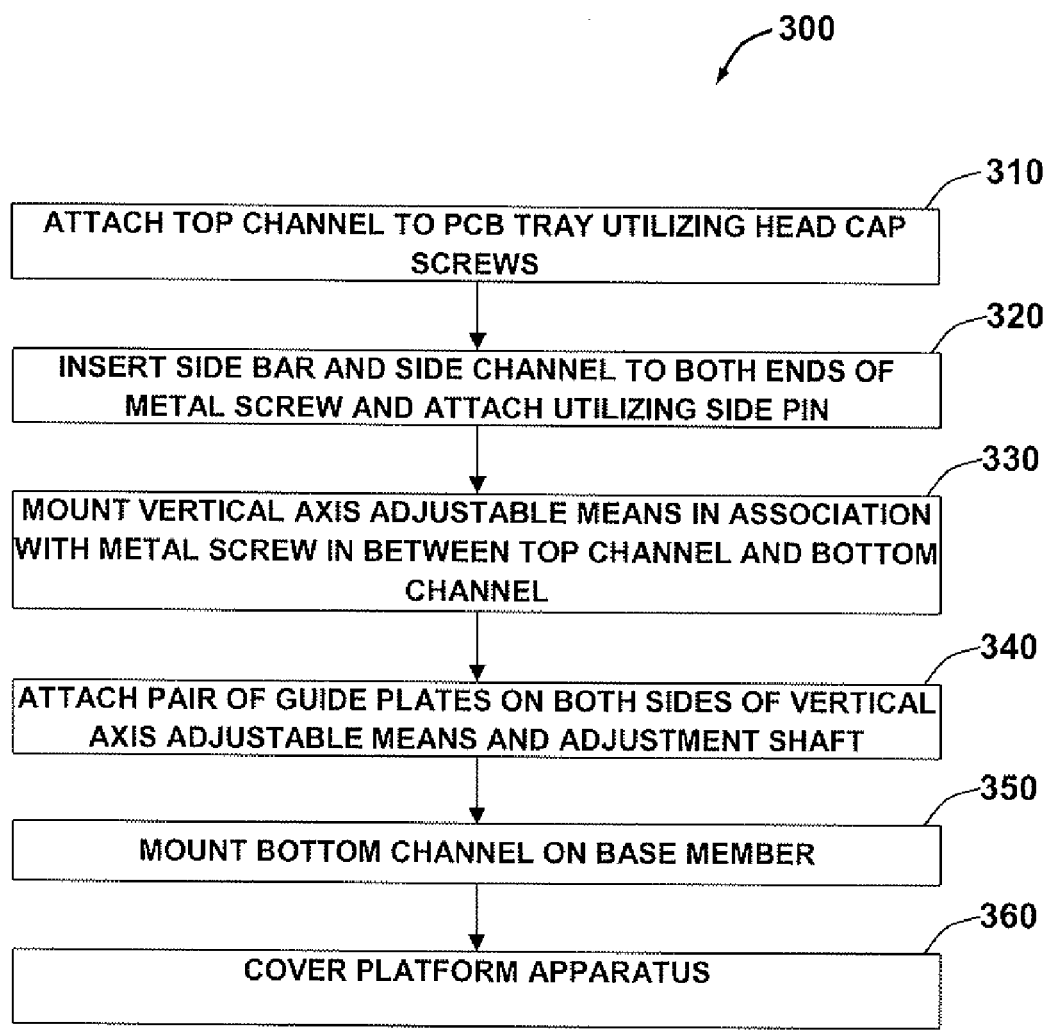
FIG. 9 illustrates a detailed flow chart of operations illustrating logical operational steps for a method of assembling the torque sensor adjustable platform, in accordance with features of the present invention.

FIG. 9 illustrates a detailed flow chart 300 of operational steps for providing the torque sensor, in accordance with features of the present invention. A top channel 105 can be attached to the PCB tray 110 utilizing head cap screws 135, as depicted at block 310. Next, as illustrated at block 320, a side bar 220 and a side channel 210 can be inserted on both ends of the adjustable shaft 150 and attached utilizing joint pins 140 and retaining rings 130. The side bars 220 and side channels 210 in association with the adjustable shaft 150 coupled to the joint pins 140 can be mounted in between the top channel 105 and the bottom channel 155, as indicated at block 330. At least one guide plate 125 can then be attached to sides of the vertical axis adjustable mechanism 110 and, via ultimate connection to joint pins 140 and the retaining rings 130, to the adjustable shaft 150, as depicted at block 340. The adjustable mechanism 250 in association with the guide plate(s) 125 can be adjusted vertically.

Thereafter, as illustrated at block 350, the bottom channel 155 can be mounted on the base member 160. The vertical axis adjustable platform apparatus 100 can be covered as depicted at block 360. The platform apparatus 100 in association with the signal receiver 240 is capable of adjusting the sensitivity associated with various shaft diameters for receiving a torque signal. Such an adjustable platform apparatus 100 associated with the torque sensor 210 provides complete torque measurement capabilities with standard analog, frequency and digital output signals. The adjustable platform apparatus 100 should perform well under extreme conditions and can be utilized in a variety of applications while offering enhanced accuracy, durability, and signal quality.

It will be appreciated that variations of the above-disclosed and other features and functions, or alternatives thereof may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system, comprising:
    an adjustable platform including a base, a sensor carrier and a translatable component; and
    a torque sensor disposed on said sensor carrier and configured to receive a torque signal from circuitry disposed on a target shaft adjacent to said torque sensor;
    wherein said movable component comprises a top channel and a bottom channel mounted to said base, said top channel and said bottom channel coupled by a pair of side bars and side channels movably connected by joint pins and a rotatable shaft movably connecting said joint pins, said joint pins connecting said pair of side bars and side channels, wherein said torque sensor is movable with respect to the base via rotation of said rotatable shaft to cause movement of said pair of side bars and side channels, thereby positioning the torque sensor in greater or lesser proximity to said target.

2. The system of claim 1, further comprising at least one guide plate attached at one side of said at least one adjustable platform, wherein said top channel and said bottom channel in association with said pair of guide plates is evenly adjustable during movement of said rotatable shaft in order to permit said torque sensor to accurately engage a target, and wherein said torque sensor detects and obtains rotational movement data from said target.

3. The system of claim 1, wherein said torque sensor further comprises a sensing element mounted in a PCB tray.

4. The system of claim 3, further comprising a remote processor in communication with said PCB tray for processing information obtained by said torque sensor.

5. The system of claim 3, further comprising at least one guide plate attached at a side of said adjustable platform, wherein said top channel and said bottom channel in association with said pair of guide plates is evenly adjustable during movement of said rotatable shaft in order to permit said torque sensor mounted in a PCB tray to accurately engage a target, and wherein said torque sensor detects and obtains rotational movement data from said target.

6. The system of claim 5, further comprising a remote processor in communication with said sensing module for processing information obtained by said torque sensor.

7. The system of claim 6, further comprising at least one guide plate attached at a side of said at least one adjustable platform, wherein said top channel and said bottom channel in association with said pair of guide plates is evenly adjustable during movement of said rotatable shaft in order to permit said torque sensor to accurately engage a target, and wherein said sensing element detects and obtains rotational movement data from said target.

8. The system of claim 7, further comprising a remote processor in communication with said remote processor for receiving torque signal information obtained by said torque sensor.

9. The system of claim 1, further comprising a remote processor in communication with said torque sensor for processing information obtained by said torque sensor.

10. The system of claim 1, further comprising a cover for protecting said platform apparatus.

11. A movement sensing system, comprising:
    a sensing module including a sensing element mounted in a PCB tray;
    an adjustable platform including said PCB tray mounted to a top channel and a bottom channel mounted to a base, said top channel and said bottom channel coupled by a pair of side bars and side channels movably connected by joint pins and a rotatable shaft movably connecting said joint pins, and said joint pins connecting said pair of side bars and side channels, wherein said PCB tray is movable with respect to the base via rotation of said rotatable shaft to cause movement of said pair of side bars and side channels, and wherein said sensing element is placed near a target after movement by said PCB tray to obtain torque data from said target; and
    at least one guide plates attached at a side of said at least one adjustable platform, wherein said top channel and said bottom channel in association with said pair of guide plates is evenly adjustable during movement of said rotatable shaft in order to permit said sensing element with said PCB tray to accurately engage a target, and wherein said sensing element detects and obtains torque data from said target.

12. The movement sensing system of claim 11, further comprising a remote processor in communication with said PCB tray for receiving torque measurements obtained from said target by said sensing element.

13. The movement sensing system of claim 11, further comprising a cover for protecting hardware associated with said adjustable platform.

14. The movement sensing system of claim 11, wherein said sensing module includes a torque sensor, said movement sensing system further comprising a remote processor in communication with said PCB tray for receiving torque measurements obtained from said target by said torque sensor and a cover for protecting hardware associated with said adjustable platform.

15. A torque sensor, comprising:

a pair of guide plates attached to sides of an adjustable mechanism and a metal screw, wherein said adjustable mechanism, in association with a pair of guide plates, is adjustable to permit a PCB tray including a torque sensing element to engage in vertical axis movement with a rotating shaft and thereby attain enhanced detection sensitivity and infinite resolution from said rotating shaft.

16. The torque sensor of claim 15, wherein said PCB tray is attached to a top channel in order to mount said at least one adjustable mechanism in association with said metal screw in-between said top channel and a bottom channel.

17. The torque sensor of claim 16, further comprising a remote processor in communication with said PCB tray for processing information obtained by said sensor element.

18. The torque sensor of claim 15, further comprising a remote processor in communication with said PCB tray for processing information obtained by said sensor element.

19. The torque sensor of claim 15, wherein said rotatable shaft is configured to achieve infinite positions.

20. The torque sensor of claim 15, further comprising said pair of guide plates attached to both sides of said adjustable mechanism utilizing at least two joint pins, wherein one joint pin is stationary and another is movable thereby allowing the movement of the platform in vertical direction with respect to said adjustable mechanism.

* * * * *